United States Patent [19]

Higgs et al.

[11] Patent Number: 5,724,309
[45] Date of Patent: Mar. 3, 1998

[54] METHOD FOR GEOPHYSICAL PROCESSING AND INTERPRETATION USING INSTANTANEOUS PHASE AND ITS DERIVATIVES AND THEIR DERIVATIVES

[75] Inventors: William G. Higgs, Manhattan Beach; Yi Luo, Brea, both of Calif.

[73] Assignee: Chevron U.S.A. Inc., San Francisco, Calif.

[21] Appl. No.: 611,544

[22] Filed: Mar. 6, 1996

[51] Int. Cl.$^6$ ................................. G01V 1/28; G01V 1/36
[52] U.S. Cl. .................................. 367/48; 367/53; 364/421
[58] Field of Search ........................ 367/48, 53; 364/421

[56] References Cited

U.S. PATENT DOCUMENTS

| | | | |
|---|---|---|---|
| Re. 24,648 | 5/1959 | Meiners | 340/15 |
| 2,888,663 | 5/1959 | Blake et al. | 340/15 |
| 3,899,768 | 8/1975 | Quay et al. | 340/15.5 DS |
| 4,633,399 | 12/1986 | Stebens et al. | 364/421 |
| 4,635,239 | 1/1987 | Neff | 367/47 |
| 4,661,935 | 4/1987 | Shock et al. | 367/70 |
| 4,779,237 | 10/1988 | Bodine | 367/47 |
| 4,884,248 | 11/1989 | Laster et al. | 364/421 |
| 5,056,066 | 10/1991 | Howard | 367/72 |
| 5,083,297 | 1/1992 | Ostrander | 367/36 |
| 5,124,952 | 6/1992 | Knize et al. | 367/34 |
| 5,226,019 | 7/1993 | Bahorich | 367/74 |
| 5,453,958 | 9/1995 | Neff | 367/70 |
| 5,500,832 | 3/1996 | Berryhill | 367/53 |

OTHER PUBLICATIONS

Luo et al, 66th Anniv. SEG Int. socty, Nov. 10, 1996, Pap. No. Int. 2-1, pp. 324-327; Abst. Only Herewith.

Barnes, A. E., Geophysics, V. 57, #11, pp. 1520-1524, Nov. 1992; Abst. only herewith.

Bahorich et al. "Stratigraphic and structural interpretation with 3-D coherence", Presented at the 64th Annual International Meeting, Society of Exploration Geophysicists (1995) 97-100.

Ortmann et al. "Successful application of 3-D seismic coherency models to predict stratigraphy, offshore eastern Trinidad", Presented at the 64th Annual International Meeting, Society of Exploration Geophysicists (1995) 101-103.

Haskell et al. "3-D seismic coherency and the imaging of sedimentological features", Presented at the 64th Annual International Meeting, Society of Exploration Geophysicists (1995) 1532-1534.

Nissen et al. "3-D seismic coherency techniques applied to the identification and delineation of slump features", Presented at the 64th Annual International Meeting, Society of Exploration Geophysicists (1995) 1535-1536.

Bahorich et al. "3-D seismic discontinuity for faults and stratigraphic features: The coherence cube", Presented at the 64th Annual International Meeting, Society of Exploration Geophysicists (1995) 93-96.

Taylor "Seeing Inspires Believing 'Coherence Cube' Seeks a Fuller View of Seismic", Explorer (Sep. 1995) 1 and 18-21.

Bahorich et al. "3-D seismic discontinuity for faults and stratigraphic features: The coherence cube", The Leading Edge (Oct. 1995) 14:1053-1058.

*Primary Examiner*—Nelson Moskowitz
*Attorney, Agent, or Firm*—Burns, Doane, Swecker & Mathis, L.L.P.

[57] ABSTRACT

A method for utilizing instantaneous phase and the derivatives of instantaneous phase as display and/or plot attributes for seismic reflection data processing and interpretation for two-dimensional and three-dimensional seismic data. The spatial frequency, dip magnitude and dip azimuth attributes of the seismic events are calculated using the rate of change of instantaneous phase with space, instantaneous frequency and velocity, and displayed or plotted to assist interpreters in identifying fault breaks and stratigraphic features in the earth's subsurface.

27 Claims, 15 Drawing Sheets

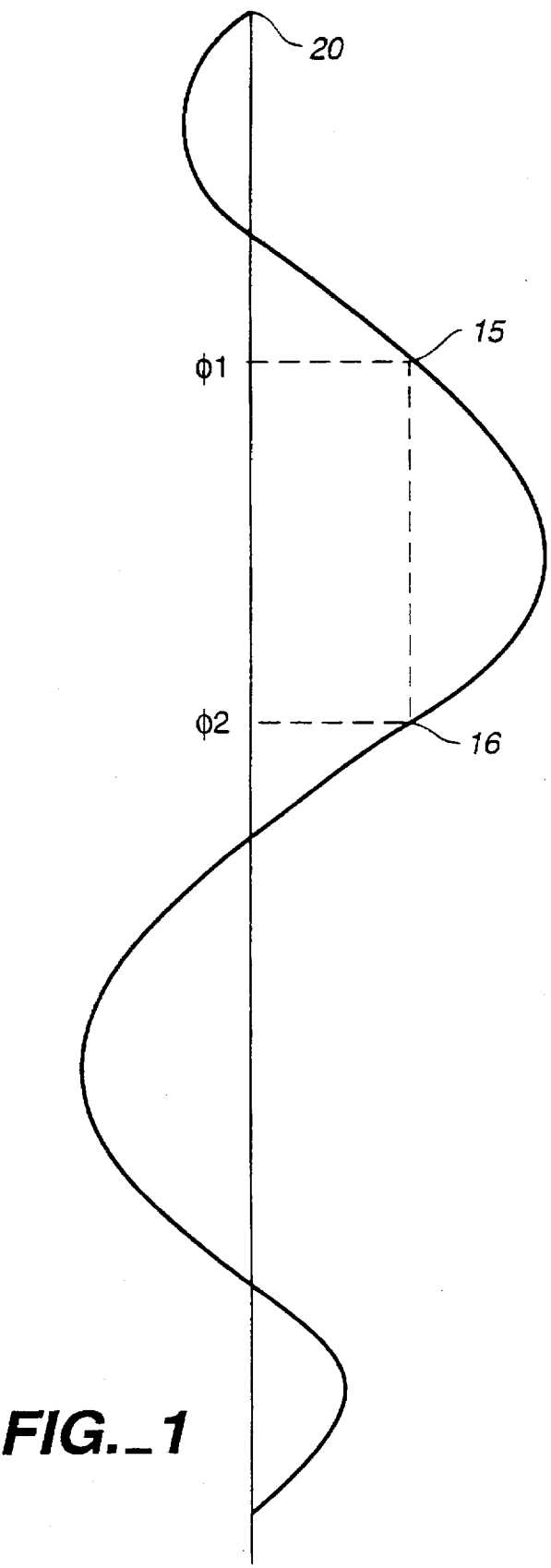
FIG._1

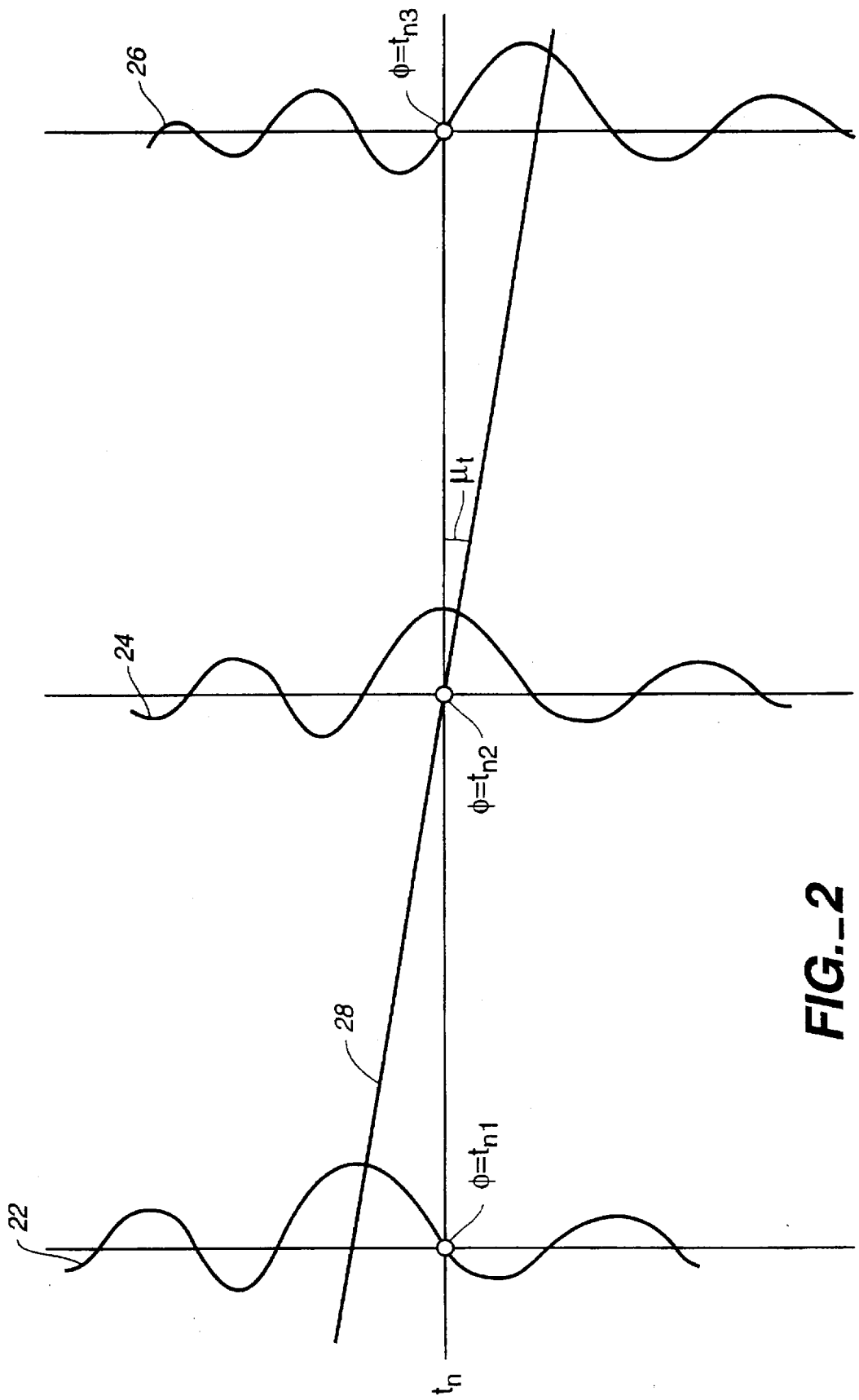
FIG._2

FIG._3 (PRIOR ART)

FIG._4

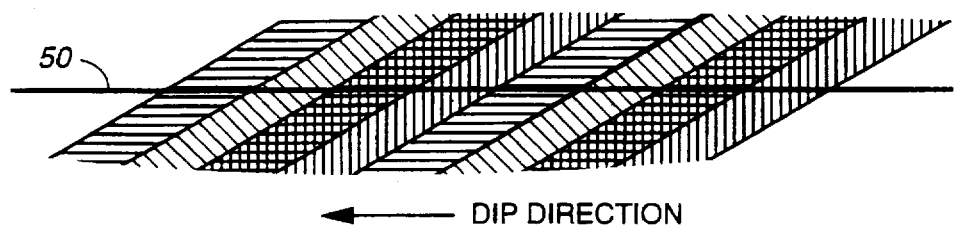
FIG._5
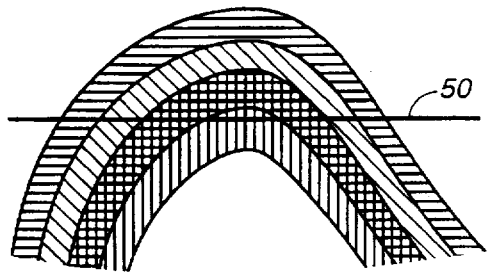
FIG._6
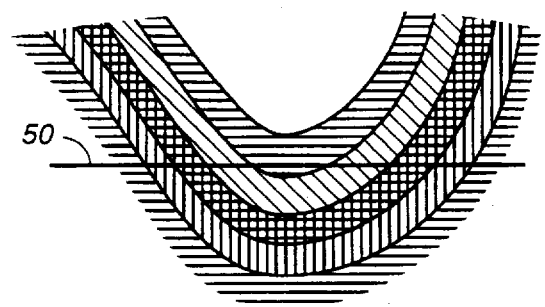
FIG._7
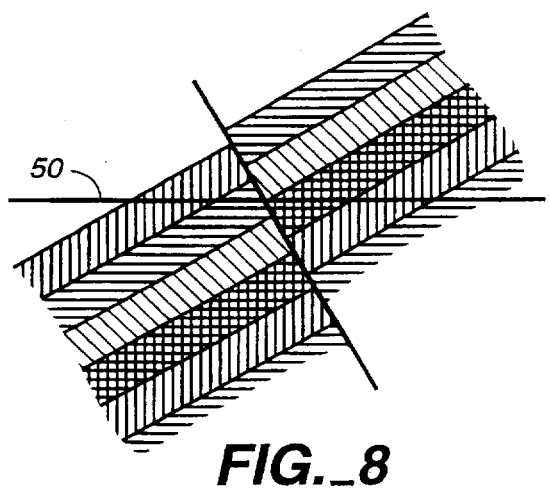
FIG._8
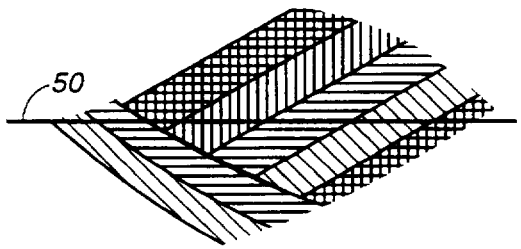
FIG._9

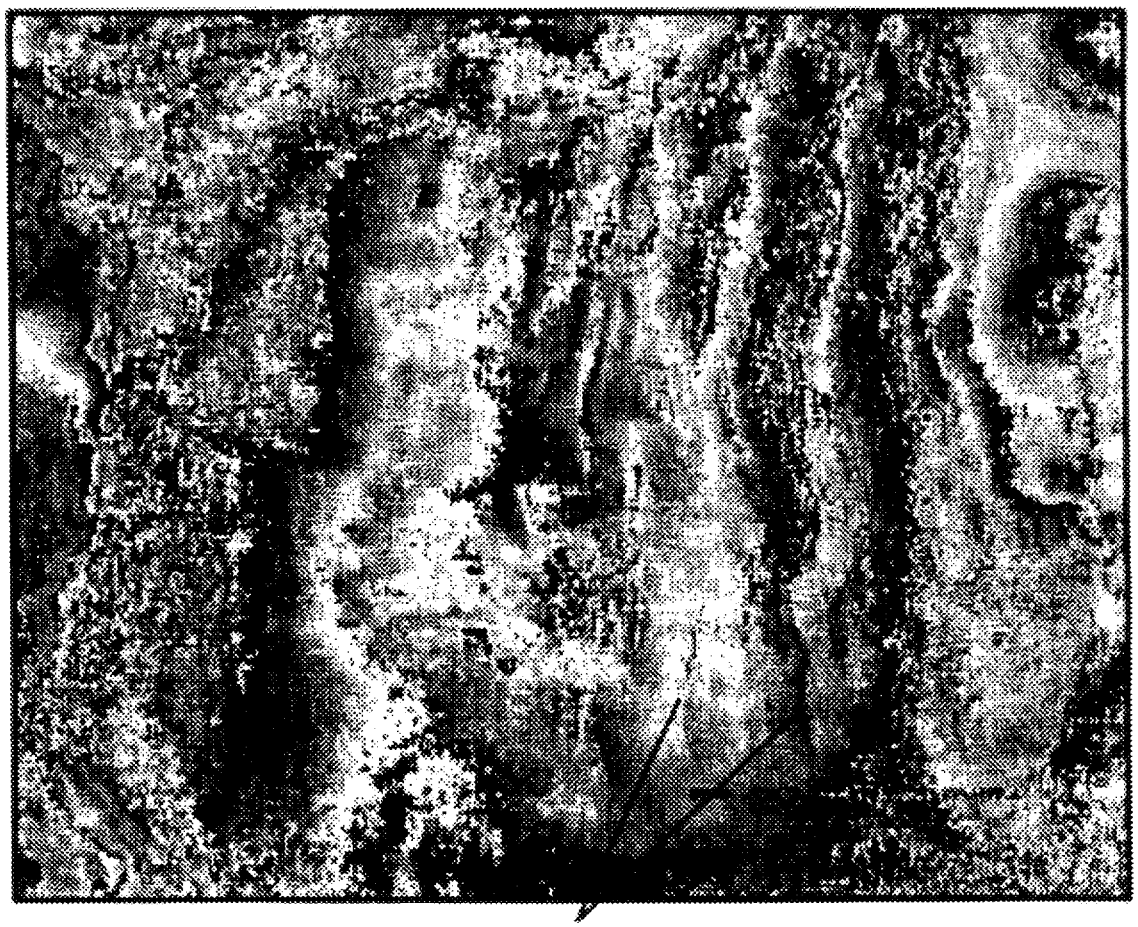
FIG._10

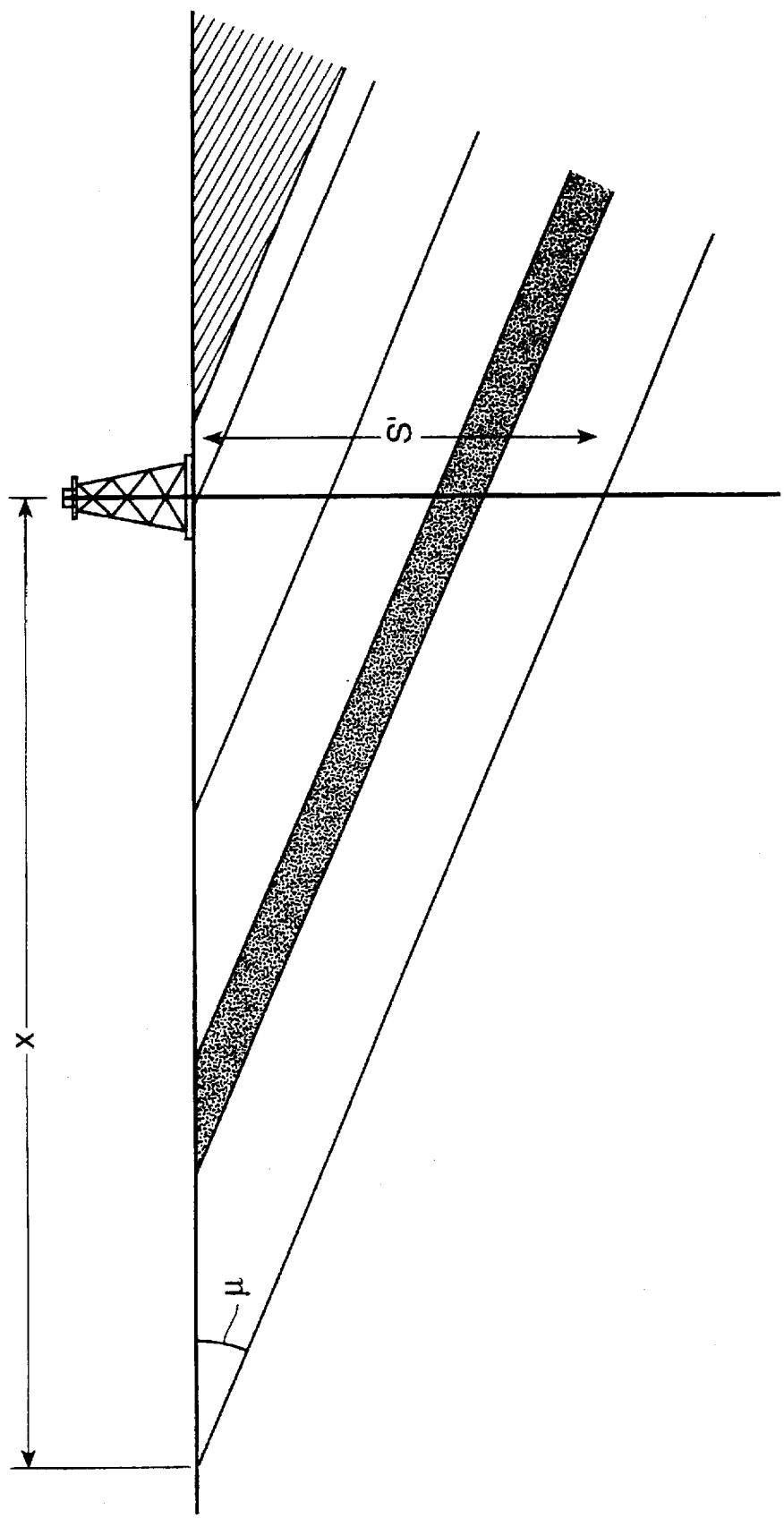
FIG._11

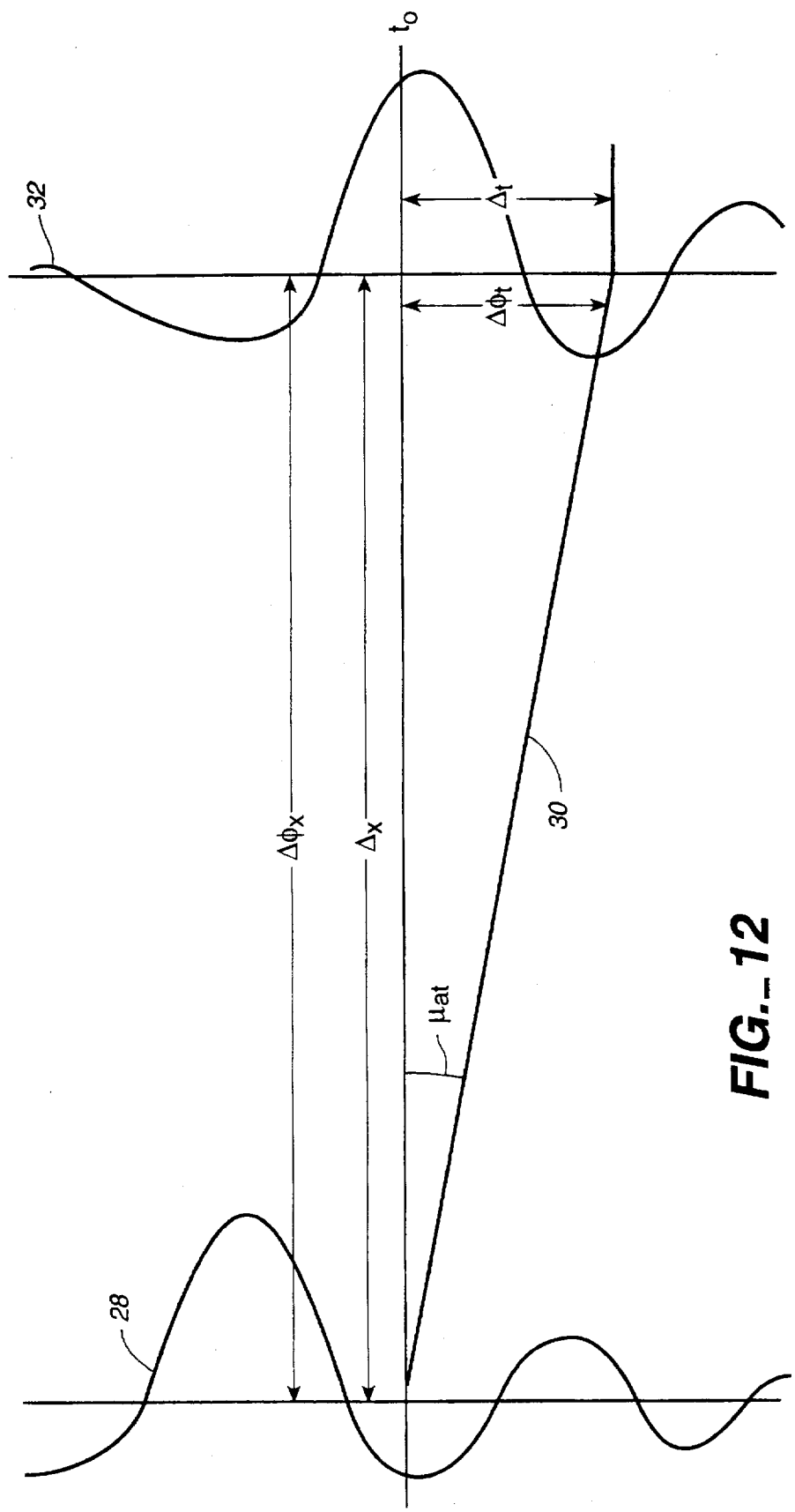

FIG._13

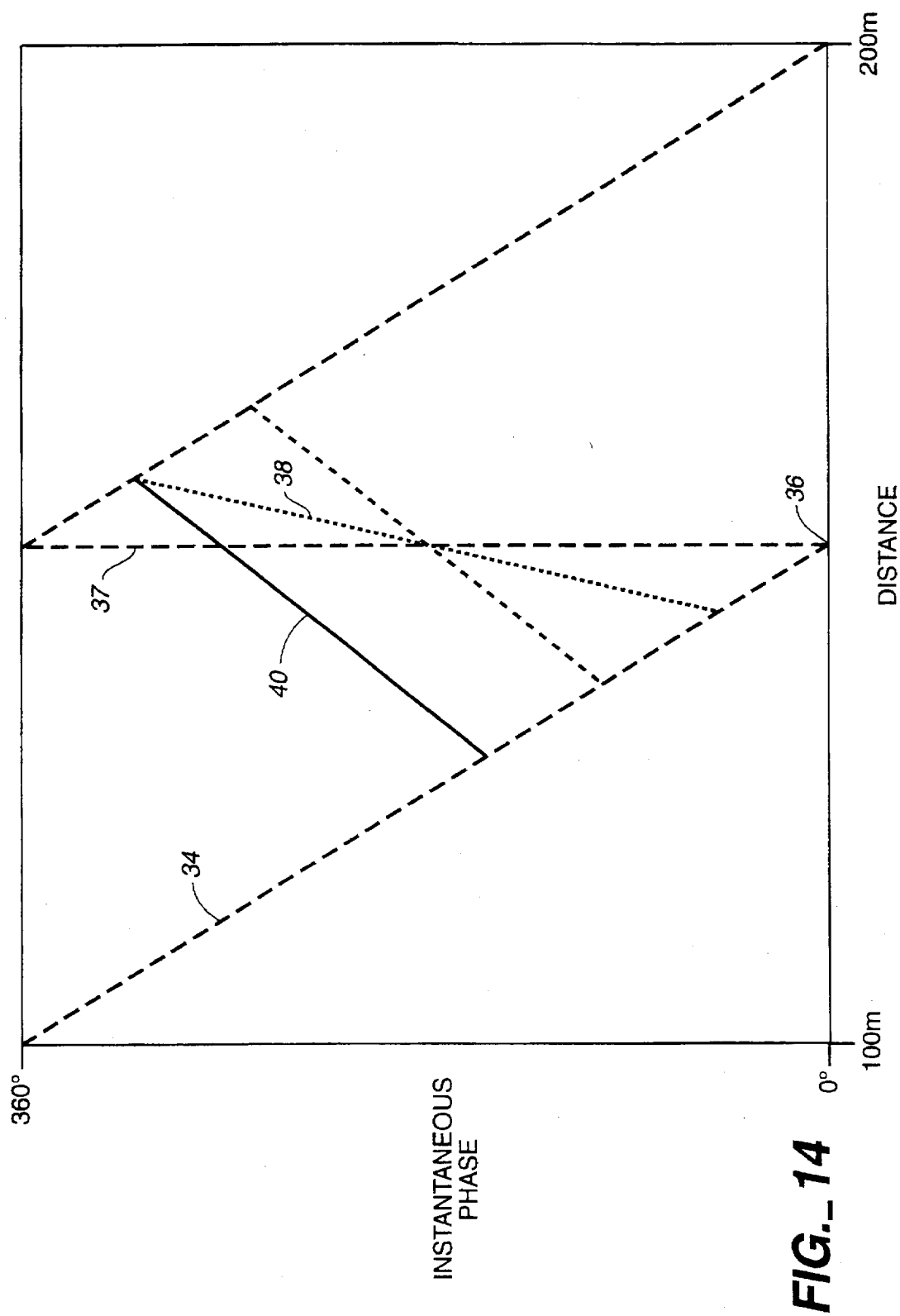
FIG._14

FIG._15

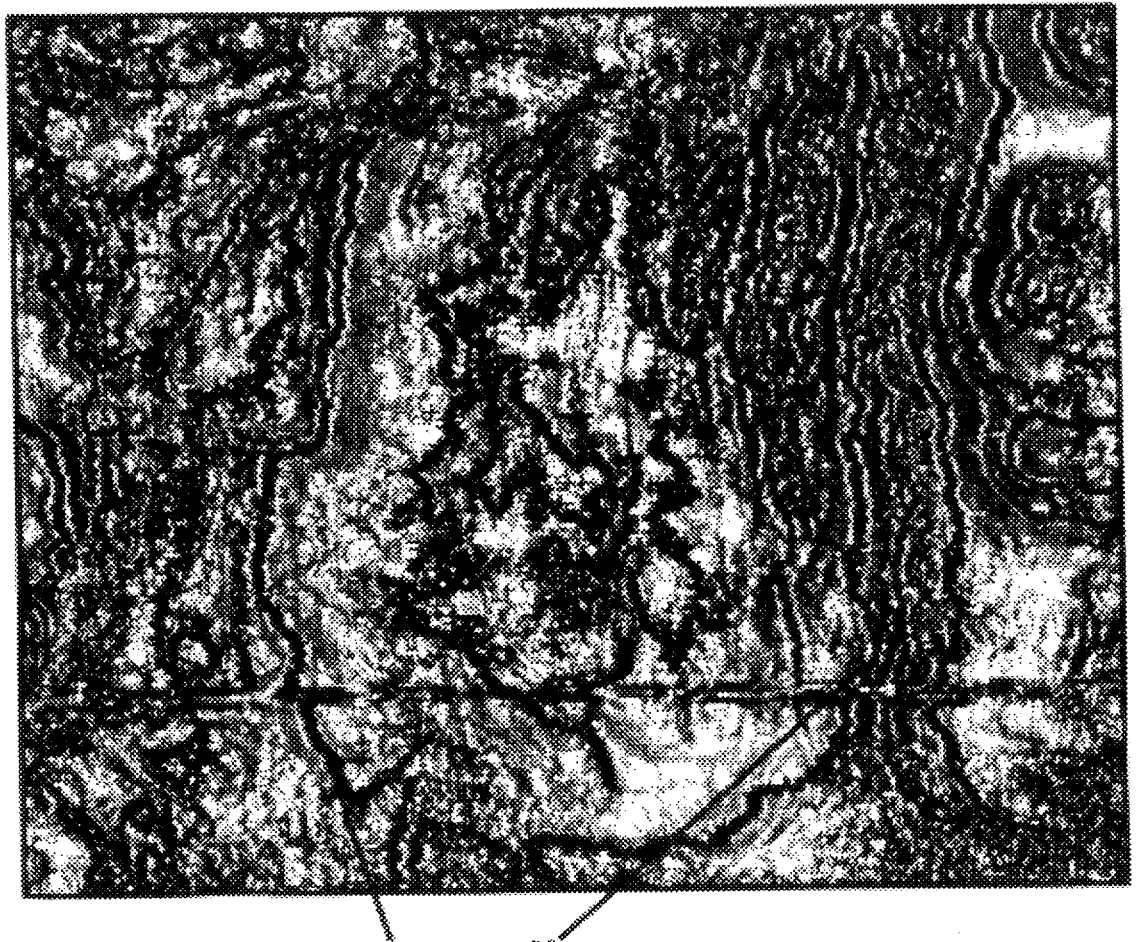
FIG._16

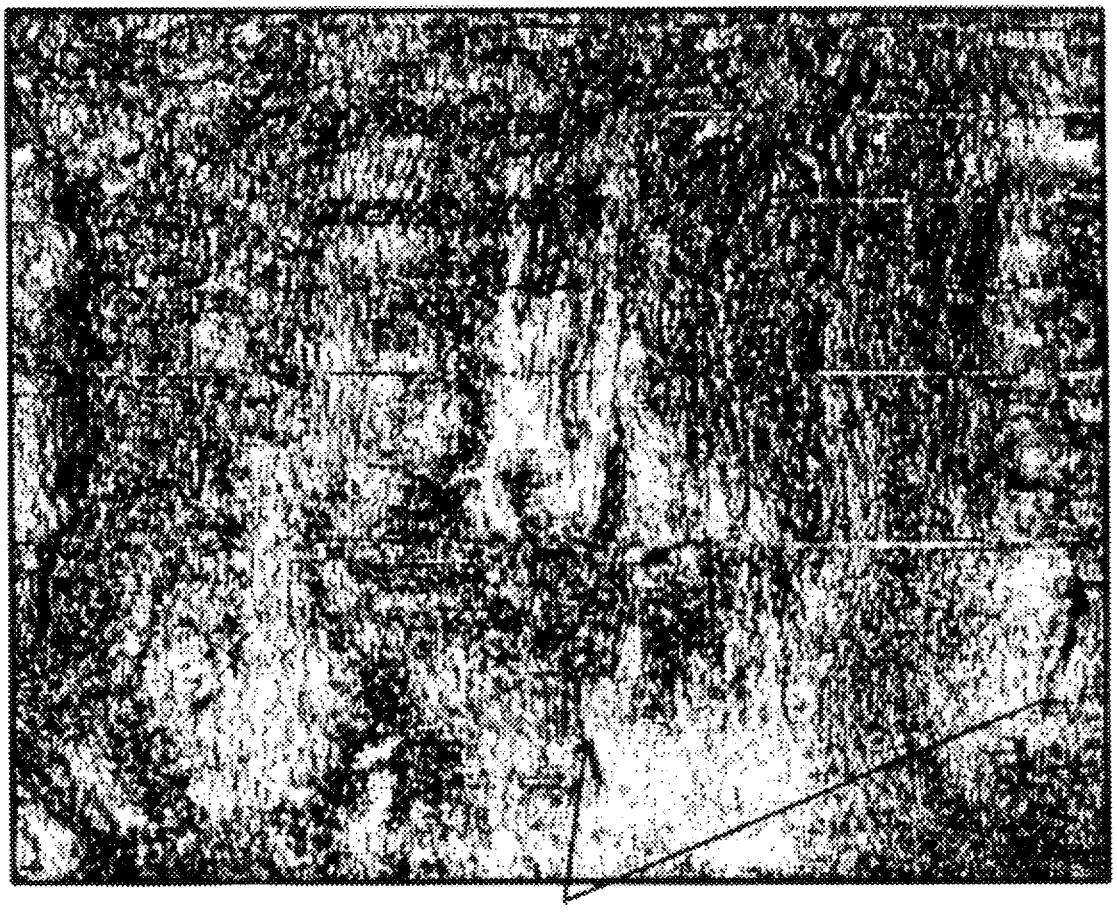
FIG._17

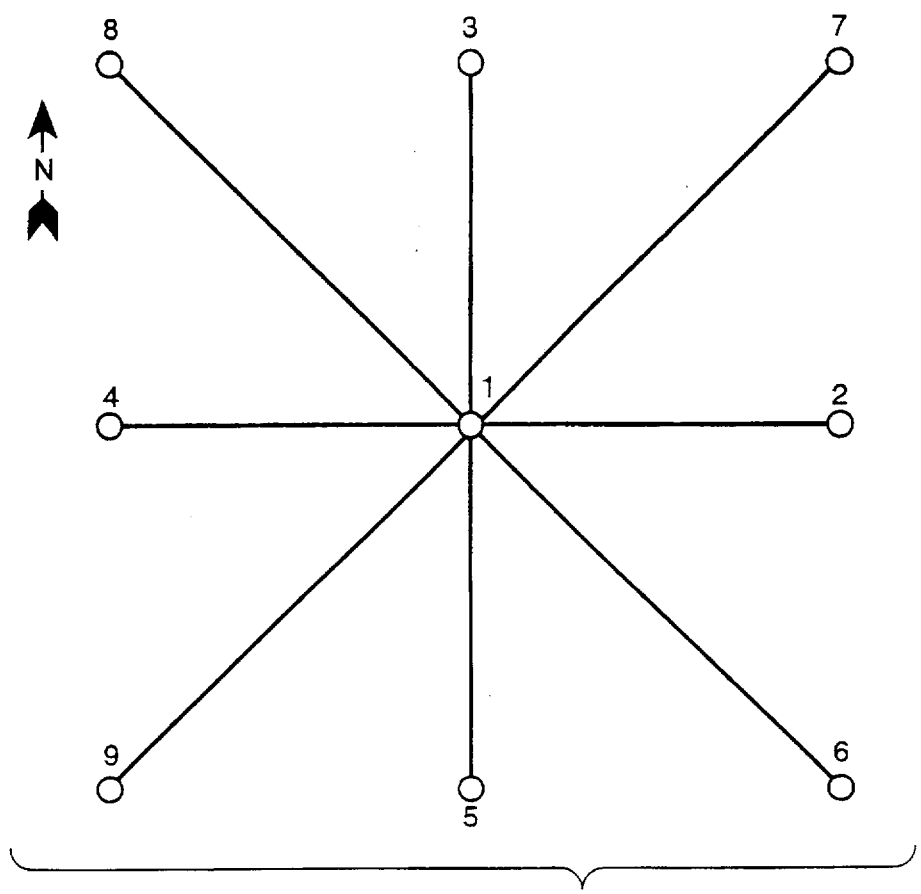
FIG._18
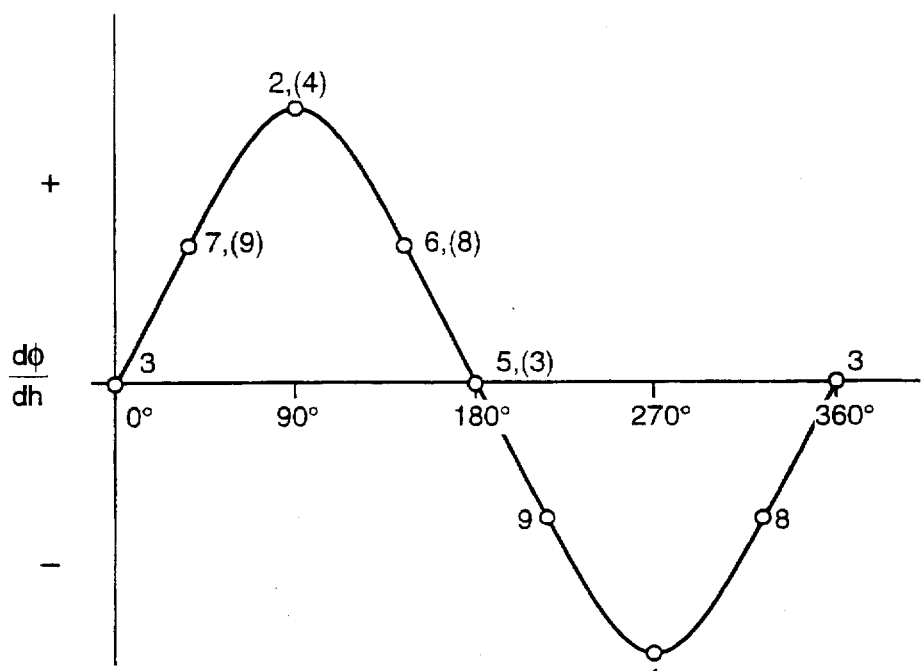
FIG._19

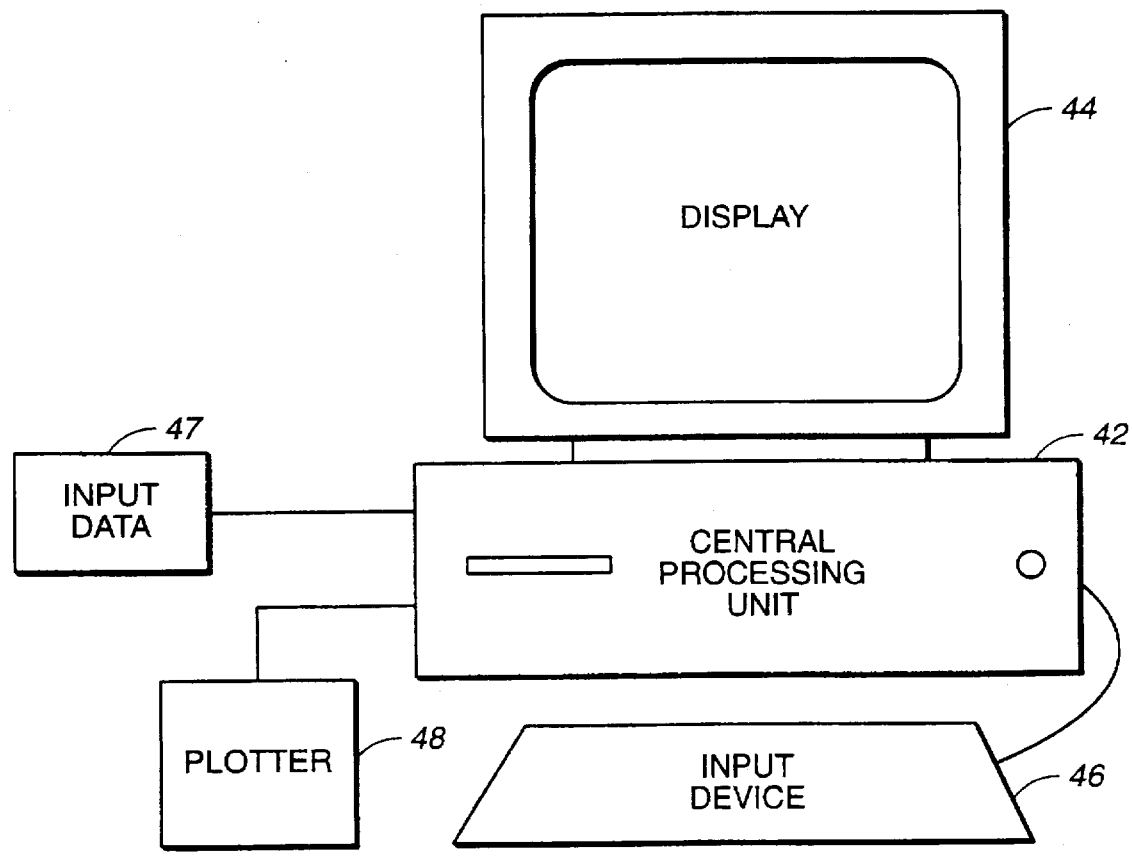
FIG._20

METHOD FOR GEOPHYSICAL PROCESSING AND INTERPRETATION USING INSTANTANEOUS PHASE AND ITS DERIVATIVES AND THEIR DERIVATIVES

FIELD OF THE INVENTION

The present invention relates generally to an improved method of geophysical exploration and more specifically to an improved method of seismic data processing and analysis for interpretation of faults and stratigraphic features in both two- and three-dimensional seismic reflection data.

The present invention identifies faults and stratigraphic features within the seismic data early in the interpretation process with two new seismic attributes (dip magnitude and dip azimuth) derived from the instantaneous phase of the seismic data. The present invention identifies faults and stratigraphic features without interpreter bias influencing the location and extent of the faults and stratigraphic features thus improving the accuracy of locating hydrocarbon reservoirs for more efficient placement of wells for hydrocarbon recovery.

BACKGROUND OF THE INVENTION

In the continuing search for hydrocarbon accumulations in the earth, geophysicists seek methods for evaluating and interpreting the structure of the earth's subsurface formations as well as the effects of stratigraphy, lithology, and pore fluid content on geophysical data in order to relate such effects to the occurrence or presence of hydrocarbons. Determining the occurrence or presence of hydrocarbons influences the placement of wells for recovering the hydrocarbons. Seismic reflection data are traditionally acquired and processed for the purpose of imaging acoustic boundaries, seismic reflection events, in the subsurface. By way of example, exploration geophysicists have developed numerous techniques for imparting seismic wave energy into the earth's subsurface formations, recording the returning reflected seismic wave energy and processing the recorded seismic wave energy to produce seismic signals or traces. Such seismic signals or traces contain a multiplicity of information for example frequency, amplitude, phase, etc., which can be related to geology, lithology or pore fluid content of the earth's subsurface formations. Such features of the seismic signals are generally referred to as instantaneous attributes. Additionally, interpretative techniques generally referred to as stratigraphic interpretative analysis have been developed for analyzing seismic data and for identifying and characterizing changes in lithology, geology and pore fluid content of the earth's subsurface formations from recurring patterns of instantaneous attributes associated with reflection events in seismic data. Exemplary of such focus are Quay et al. in U.S. Pat. No. 3,899,768 and Bodine in U.S. Pat. No. 4,779,237.

The seismic attribute most commonly displayed and/or plotted during the interpretation of both two-dimensional and three-dimensional seismic data is amplitude. This has come about for good reasons as amplitude distinguishes many of the more subtle features of the subsurface that we wish to identify. For example, amplitude 'bright spots' are commonly used as direct hydrocarbon indicators and the correlation of reflections is often defined by a characteristic amplitude response.

The use of three-dimensional seismic data continues to grow. Three-dimensional seismic data provides a more detailed structural and stratigraphic image of sub-surface reservoirs than can be obtained from two-dimensional data. The results have been increased hydrocarbon reserve estimates, cost savings from more accurate positioning of delineation and development wells, improved reservoir characterization leading to better simulation models, and the ability to more accurately predict future opportunities and problems during the subsequent production of a field. As an exploration tool, three-dimensional seismic data reduces drilling risk in structurally complex areas and lends itself to reservoir quality prediction in undrilled areas.

The principal advantage of three-dimensional over two-dimensional seismic data is that three-dimensional provides the interpreter with the ability to view seismic data in a horizontal "map" form rather than being limited to one or more vertical cross-section views. Using traditional two-dimensional methods of viewing vertical profiles, it is often difficult to get a clear and unbiased view of faults and stratigraphic features that are hidden in three-dimensional data. Although faults are often readily seen on individual vertical seismic cross-sections, multiple vertical cross-sections must be examined to determine the lateral extent of faulting. Stratigraphic changes are difficult to detect on vertical seismic lines because of the limited profile that they present. To avoid these issues geoscientists have traditionally utilized two kinds of seismic map displays/plots: amplitude time-slices and seismic horizon-slices.

The amplitude time-slice is a horizontal plane, at a constant time, through the three-dimensional volume, which displays the amplitude of the seismic data at that time without reference to a stratigraphic horizon. An advantage of the amplitude time-slice is that an interpreter can view geologic features in map form without having to first pick seismic events in the data. The amplitude time-slice is quite underutilized because the amplitude time-slices can be difficult to interpret, even for experienced geoscientists.

The interpretation of features on time slices is currently restricted by the use of seismic amplitude as the display attribute. The problem with amplitude in the time slice dimension is that it is impossible to distinguish the direction of dip from a single time slice. In order to distinguish dip an interpreter must currently view an inline or crossline, or scroll through a number of time slices to see in which direction the events move. For large structures this is not too restricting, however, for more detailed structural interpretation it is frustrating and tedious.

When amplitude is used as the display/plot attribute, the time slice domain does yield some degree of structural information and spatial correlations over large areas, however, dip direction and fault breaks cannot be identified with any certainty. In particular, it is the uncertainty of correctly locating faults on time slices that has developed the 'look at but don't interpret' philosophy of seismic interpreters towards time slices. Both of the problems of dip and fault identification are caused by one of the properties of amplitude, which is for any cycle on a single trace there are always two equal amplitude values apart from the minimum and maximum values. Dual amplitude values make it impossible to distinguish the direction of dip because the dual amplitude values yield two possible solutions to the dip direction as the two solutions are opposite, which results in an error in the direction of dip of 180 degrees. Secondly, the dual amplitude values diminish the resolution of the data for the identification of faults.

Time-slices are more suitable than vertical profiles for detecting and following the lateral extent of faults and stratigraphic boundaries. However, interpretation is often complicated by the fact that time-slices can cut through different stratigraphic horizons. This problem can be avoided through the use of the horizon-slice, which is the set of seismic amplitudes associated with an interpreted horizon surface, generally at some consistent stratigraphic level. The fact that the horizon surface is at a consistent stratigraphic level means that the attribute extracted from the seismic data to be displayed can highlight subtle lateral changes in the stratigraphy, lithology and fluid content at that one stratigraphic level. The use of previously interpreted surfaces for subtle edge detection is the current state-of-the-art.

In spite of the fact that horizon-slices and associated attribute maps are more useful than amplitude time slices for following faults and stratigraphic features, they too have disadvantages. The geoscientist must "pick" a stratigraphic surface prior to generating the amplitude display/plot, which can be difficult and time-consuming. This also imposes an interpretive bias on the data set and requires that the interpreter has already defined the fault framework that intersects with the horizon under consideration. The existing edge detection routines are, therefore, only used to identify subtle faults that were not previously interpreted and to highlight the interpreted faults. The other disadvantage of horizon slices is that the results can only be obtained on isolated surfaces in the three-dimensional volume and not on the whole volume.

Other attributes of seismic reflections besides amplitude may be calculated and displayed in a map view as well, including frequency and instantaneous phase. These attributes, however, do not currently form part of the traditional three-dimensional seismic interpretation process and are used more as quality control checks of the processing and migration of the three-dimensional seismic data, or for enhancing event continuity in areas of noisy data on vertical profiles.

SUMMARY OF THE INVENTION

The methods of the present invention produce two new seismic attributes derived from the instantaneous phase: dip magnitude and dip azimuth. In accordance with the present invention, a new technique has been discovered which utilizes instantaneous phase and the derivatives of instantaneous phase as the seismic display and/or plot attribute(s) for two-dimensional and three-dimensional seismic data. Time slice interpretation and the whole three-dimensional seismic interpretation process is improved dramatically by the use of instantaneous phase and derivative displays/plots as the active time slice and vertical profile display/plot attributes.

The instantaneous phase attribute enables the dip direction of the seismic events to be determined resulting in a rapid understanding of the geological structure of the subsurface formations being evaluated. Furthermore, the actual dip magnitude of the seismic events can be calculated if the instantaneous frequency, rate of change of instantaneous phase with respect to distance (spatial frequency) and velocity are known. The present invention provides the capability of performing edge detection operations without an interpreter's bias to locate fault breaks and seismic stratigraphic features early in the interpretation process throughout a two-dimensional section or three-dimensional volume. Currently, edge detection algorithms can only be performed on the "picked surfaces", mentioned previously, which by definition requires that the structural framework has already been established.

In accordance with one aspect of the present invention, there is provided a method of processing data of seismic traces for geophysical interpretation of the earth's subsurface, comprising the steps of determining the spatial frequency values for each of a plurality of data points in the seismic data and posting the spatial frequency values to identify changes within the earth's subsurface.

In accordance with another aspect of the present invention, there is provided a method of processing data of seismic traces for geophysical interpretation of the earth's subsurface, comprising the steps of determining the spatial frequency values for each of a plurality of data points in the seismic data, determining the instantaneous frequency values for each of the plurality of the data points of the seismic data, determining an apparent dip magnitude value for each of the plurality of data points in a predetermined direction using the spatial frequency values and the instantaneous frequency values and posting the apparent dip magnitude values for each of the plurality of data points to identify changes within the earth's subsurface.

In accordance with another aspect of the present invention, there is provided a method of processing data of seismic traces for geophysical interpretation of the earth's subsurface, comprising the steps of determining the spatial frequency values for each of a plurality of data points in the seismic data, determining the instantaneous frequency values for each of the plurality of the data points of the seismic data, determining a dip magnitude value for each of the plurality of data points using the spatial frequency values and the instantaneous frequency values and posting the dip magnitude values for each of the plurality of data points to identify changes within the earth's subsurface.

In accordance with yet another aspect of the present invention, there is provided a method of processing data of seismic traces for geophysical interpretation of the earth's subsurface, comprising the steps of determining spatial frequency in the x direction for each of a plurality of data points in the seismic data, determining spatial frequency in the y direction for each of a plurality of data points in the seismic data, determining dip azimuth for each of the plurality of data points using the respective spatial frequency in the x direction and spatial frequency in the y direction for each of the plurality of data points and posting the dip azimuth values for each of the plurality of data points to identify changes within the earth's subsurface.

In accordance with another aspect of the present invention, there is provided a method for producing an instantaneous phase seismic display from data of seismic traces for geophysical interpretation of the earth's subsurface, comprising the steps of determining the instantaneous phase values for each of a plurality of data points in the data of seismic traces and posting the instantaneous phase values at a constant horizontal level to transform the instantaneous phase values into an indication of a dip magnitude and a dip azimuth of seismic events associated with the earth's subsurface.

BRIEF DESCRIPTION OF THE DRAWING

The invention will now be described with reference to the accompanying drawing, in which:

FIG. 1 is a diagrammatic representation of a portion of a seismic trace;

FIG. 2 is a diagrammatic representation of a portion of three seismic traces identifying a seismic event;

FIG. 3 is a conventional time slice plot with amplitude as the plot attribute as is generally known in the prior art;

FIG. 4 is a time slice plot with instantaneous phase as the plot attribute in accordance with one embodiment of the present invention;

FIG. 5 is cross-sectional diagrammatic representation of multiple events having a constant dip direction in accordance with one embodiment of the invention;

FIG. 6 is a cross-sectional diagrammatic representation of an anticline in accordance with one embodiment of the invention;

FIG. 7 is a cross-sectional diagrammatic representation of a syncline in accordance with one embodiment of the invention;

FIG. 8 is a cross-sectional diagrammatic representation of a fault in accordance with one embodiment of the invention;

FIG. 9 is a cross-sectional diagrammatic representation of an unconformity in accordance with one embodiment of the invention;

FIG. 10 is a time slice plot with spatial frequency as the plot attribute in accordance with one embodiment of the present invention;

FIG. 11 is a cross-sectional diagrammatic representation of an outcrop on a horizontal plane with a stratigraphic thickness known from a vertical well;

FIG. 12 is a diagrammatic representation of a portion of two seismic traces cut by a dipping seismic event;

FIG. 13 is a non-decycled time slice plot with illuminated dip azimuth as the plot attribute in accordance with one embodiment of the present invention;

FIG. 14 is a diagrammatic representation of the cause of phase cycle skipping;

FIG. 15 is a decycled time slice plot with illuminated dip azimuth as the plot attribute in accordance with one embodiment of the invention;

FIG. 16 is a non-decycled time slice plot with dip magnitude as the plot attribute in accordance with one embodiment of the invention;

FIG. 17 is a decycled time slice plot with dip magnitude as the plot attribute in accordance with one embodiment of the invention;

FIG. 18 is a top plan view of a diagrammatic representation of a 3 by 3 array of seismic traces;

FIG. 19 is a diagrammatic representation of a least squares fit of a sine function for four (or eight) values from the 3 by 3 array of FIG. 18; and FIG. 20 is a diagrammatic representation of a computer system useful with the present invention.

DETAILED DESCRIPTION OF THE PREFERRED EMBODIMENTS

Prior to our discussing this invention in detail, the following terms will first be defined.

Definitions

Geophysical interpretation includes the use of reflection and refraction seismic, magnetic, and gravity methods for the analysis of the earth's subsurface. These techniques can be applied to the exploration of oil and gas, minerals, and ground water evaluation.

Seismic Event is the reflection of the seismic wave energy that has been sent into the subsurface which results from a change in the rock properties of the subsurface, or a combination of such changes. This energy is recorded at a number of shotpoints, which results in a similar feature on a number of adjacent seismic traces. The similar feature(s), therefore, result in a continuous event in the seismic data.

Picked Surface is a seismic event of interest to the interpreter, which the interpreter has hand correlated or used autopicking routines to correlate. The seismic event is assigned a specific suite of attributes (e.g. name, color etc.), which are then attached to specific traces in the data volume. The resulting surface represents the geometry of the specific seismic event in the subsurface.

Dip Magnitude is the angle of maximum dip, measured from the horizontal, at a specific point on a picked surface or seismic event. The dip magnitude can change at different locations on the surface, but is defined as the maximum value at each of those locations.

Dip Azimuth is the direction of maximum dip of a picked surface or seismic event (i.e., the compass orientation) in the direction of the dip magnitude. In the following description the dip azimuth will always refer to the direction of dip with respect to true north.

Apparent Dip Magnitude is the angle of dip, measured from the horizontal, at a specific point on a picked surface or seismic event relative to a particular predefined orientation (e.g., a two-dimensional seismic section). The apparent dip magnitude need not be, and rarely is, the maximum or true dip magnitude. In fact, the apparent dip magnitude is always less than or equal to the true dip magnitude. The orientation of the apparent dip is defined by the sign (positive or negative) of the angle, which means a dip either to the left or right depending on the convention used.

Edge Detection is defined as the search for boundaries within a seismic data volume that represent faults, stratigraphic discontinuities, changes in lithology, changes in rock properties, changes in fluid content of the formations, and/or changes in the geometry or structural form of subsurface formations.

A time or depth value as used in this application refers to a value that is expressible in either time (i.e., two-way travel time for a reflected seismic wave) or depth. It should be understood that units of time or depth can both be used with equivalent effect in this invention, although they will yield different end values from the calculations.

Instantaneous Phase as the Display and/or Plot Attribute

The present invention is applicable to both migrated and stacked three-dimensional data as well as two-dimensional data. Each of the seismic traces can be obtained by conventional surface seismic equipment such as seismic sources and receivers (e.g., hydrophones and geophones). Conventionally, seismic traces are from either a single set of three-dimensional seismic traces or from several sets or lines of two-dimensional seismic traces. As is well known to those of ordinary skill in the art, a seismic trace corresponding to a particular location on a subterranean surface is typically a composite trace resulting from stacking of numerous traces corresponding to that location and produced by detection of seismic waves by receivers having that location as their common depth point.

We have discovered that the use of instantaneous phase at a constant stratigraphic level and/or at a constant time, depth or horizontal plane greatly improves the understanding of the structure of an area by providing dip and strike information of seismic events and edge detection capabilities for the identification of faults and stratigraphic boundaries early in the interpretation process. Likewise, we have discovered that the use of derivatives of instantaneous phase in volumes and/or at a constant level in horizontal, vertical and/or oblique planes, and/or a constant stratigraphic levels also greatly improves the understanding of the structure of an area by providing dip and strike information of seismic events and edge detection capabilities for the identification of faults and stratigraphic boundaries early in the interpretation process. This information can be rapidly used to build up the structural framework as an integral part of the surface interpretation.

The inability to clearly identify dip direction and fault breaks is a result of one of the properties of amplitude as illustrated in FIG. 1. For any cycle of a single trace 20, there are always two equal amplitude values 15 and 16 (which is referred to as "dual amplitude"), with the exception of the minimum and maximum values. The dual amplitude values 15 and 16 prevent the identification of dip direction when comparing two or more adjacent traces at a constant time. This inability to identify the direction of dip on an amplitude time slice occurs because the dual amplitude values result in two possible solutions to the dip direction of the seismic events for that time slice that are diametrically opposite. In addition, fault identification is inhibited because the dual amplitude values diminish the resolution of the data.

However, each of the dual amplitude values has a unique instantaneous phase value, $\phi_1$ and $\phi_2$ as shown in FIG. 1. Because of the fact that instantaneous phase has a unique value for a single cycle of a trace 20, we have unexpectedly discovered that by plotting instantaneous phase as the attribute on a time slice map plot (FIG. 4), the directional ambiguity of the dip of the seismic events associated with amplitude is removed. This unexpected discovery is demonstrated diagrammatically in FIG. 2. It is generally known by one of ordinary skill in the art that posting, plotting, displaying, graphing, etc. are equivalent methods of viewing the results of calculations. In the present description and appended claims, the terms posting, plotting, displaying, etc. are used interchangeably as describing any of the methods of viewing the results of calculations. The three traces 22, 24 and 26 describe a dipping event 28 that has an angle of time dip, $\mu_r$. Time dip is the magnitude of the dip with respect to the horizontal (i.e., time slice $t_n$) dimension. Because of the dip of the event, at the time slice $t_n$ the instantaneous phase changes from 180° ($t_{n1}$) to 0° ($t_{n3}$) in the direction of the dip of the event. Instantaneous phase on a time slice, therefore, decreases in magnitude in the same direction as the direction of the dip. Therefore, when instantaneous phase is plotted as the time slice attribute (FIG. 4), the direction of dip of the seismic events is identifiable. This discovery was previously unrecognized because instantaneous phase has traditionally been used in vertical profiles for processing quality control, identification of seismic multiples and event correlation. In addition, the time slice domain is underutilized in the conventional interpretation processes because interpreters commonly apply the traditional two-dimensional interpretation techniques to three-dimensional seismic and the conventional interpretation systems are limited in their use of time slices.

Furthermore, based on the fact that there are no rapid lateral changes in phase or frequency within the seismic data over the trace spacing used for the calculation of the rate of change of instantaneous phase (other than random noise), we have discovered that the rate of change of instantaneous phase is proportional to the rate of change of dip. A preferred spacing used for the rate of change calculation is 3 to 50 traces, more preferably 3 to 12 traces, but the rate of change calculation is equally applicable on 2 to any number of traces. The areas of high dip are, therefore, distinguishable from the areas of low dip based on the rapid (or not so rapid) horizontal change in phase when instantaneous phase is plotted as the time slice attribute.

FIG. 4 is a plot outputted from a conventional computer system and plotter at a single time (or depth) using instantaneous phase as the plot attribute. FIG. 4 illustrates that the direction of dip and the rate of dip of seismic events are identifiable in a single time slice map plot. Once an instantaneous phase has been assigned to each data point which is to appear in the plot, shades of gray (or color) are assigned to each point based on the instantaneous phase. Any suitable color or shading scheme may be utilized. Preferably, at least four distinguishable colors or shades are used. Larger numbers of colors or shades give better apparent resolution which allows for greater ease in interpretation. For purposes of this discussion the direction of dip for the seismic events can be identified by the change in phase from high angles of instantaneous phase (i.e., white) to low angles of instantaneous phase (i.e., black). The color scale decreases from white to light grey to dark grey to black. Each shade is representative of a different range of instantaneous phase. White represents angles from 360 to 271 degrees. Light grey represents angles from 270 to 181 degrees. Dark grey represents angles from 180 to 91 degrees. Black represents angles from 90 to 1 degrees. Accordingly, dip direction down (i.e., down dip) is identified by a change from whim to light grey, light grey to dark grey, whim to dark grey, etc. The areas of high dip are distinguished from the areas of low dip based on the compactness or spaciousness of each of the color contours (i.e., the width of each of the color bands). Areas with wide color bands are areas of low or gradual dip. Accordingly, areas with narrower color bands are areas of high or steep dip.

The plot of FIG. 4 is obtained by projecting seismic events onto a horizontal plane and connecting common instantaneous phase values with the color bands. This provides the geoscientist/interpreter a valuable picture of the dip direction and rate of dip of the seismic events in one map view. Various plotters can be used to produce the volumes and map views, for example, a "DesignJet 755CM", model no. C3198A from the Hewlett-Packard Co. in Palo Alto, Calif.

The color cycle (i.e., a pattern of color bands) from whim to light gray to dark gray to black represents the individual cycle of a single seismic event of the seismic data. A series of repeating patterns of the color bands (i.e., a first pattern of white, light gray, dark gray, black followed by a second pattern of white, light gray, dark gray, black) represents two or more events dipping in the same direction (FIG. 4). A change in the pattern will represent anticlines (i.e., black, dark gray, light gray, white, light gray, dark gray, black) and synclines (i.e., white, light gray, dark gray, black, dark gray, light gray, white) (FIG. 4). Faults and anomalous stratigraphic boundaries are associated with very rapid changes in phase (i.e., white, light gray, black)(FIG. 4). The dip magnitude is shown semi-quantitatively with the compactness or spaciousness of the width of each of the color bands. This visual analysis is only semi-quantitative because of changes in the frequency of the data in the three-dimensional seismic data volume. FIG. 4 illustrates how a syncline 52, anticline 54, fault 56 and stratigraphic boundary 58 can be easily identified with instantaneous phase as the plotted attribute. A comparison of FIG. 4 to FIG. 3 (which is a time slice using amplitude as the plot attribute as is conventionally known in the art) also shows that an instantaneous phase image is much sharper than an amplitude image.

The convention just discussed is applied for purposes of illustration in this description, an opposite convention (or any convention, including a color convention as described below) is equally applicable to the present invention. Knowing the instantaneous phase convention used for the seismic data is helpful but the phase can easily be obtained from viewing a vertical profile of instantaneous phase.

The plot of FIG. 4 at a single time (or depth) using instantaneous phase as the plot attribute can be done with a color convention as well (not shown). Once an instantaneous phase has been assigned to each point which is to appear in the plot, shades of color are assigned to each point based on the instantaneous phase. Any suitable color scheme may be utilized. Preferably, at least four distinguishable colors are used. Larger numbers of colors give better apparent resolution which allows for greater ease in interpretation. For purposes of this discussion the direction of dip for the seismic events can be identified by the change in phase from high angles of instantaneous phase (i.e., red) to low angles of instantaneous phase (i.e., blue)(not shown). The color scale decreases from red to yellow to green to blue. Each color is representative of a different range of instantaneous phase. Red represents angles from 360 to 271 degrees. Yellow represents angles from 270 to 181 degrees. Green represents angles from 180 to 91 degrees. Blue represents angles from 90 to 1 degrees. Accordingly, dip direction down (i.e., down dip) is identified by a change from red to yellow, yellow to green, red to green, etc. The areas of high dip are distinguished from the areas of low dip based on the compactness or spaciousness of each of the color contours (i.e., the width of each of the color bands). Areas with wide color bands are areas of low or gradual dip. Accordingly, areas with narrower color bands are areas of high or steep dip.

A color cycle (i.e., a pattern of color bands) from red to yellow to green to blue represents the individual cycle of a single seismic event of the seismic data. A series of repeating patterns of the color bands (i.e., a first pattern of red, yellow, green, blue followed by a second pattern of red, yellow, green, blue) represents two or more events dipping in the same direction. A change in the pattern will represent anticlines (i.e., blue, green, yellow, red, yellow, green, blue) and synclines (i.e., red, yellow, green, blue, green, yellow, red). Faults and anomalous stratigraphic boundaries are associated with very rapid changes in phase (i.e., red, yellow, blue). The dip magnitude is shown semi-quantitatively with the compactness or spaciousness of the width of each of the color bands. This visual analysis is only semi-quantitative because of changes in the frequency of the data in the three-dimensional seismic data volume.

FIGS. 5–9 use the color shading convention specified in MPEP Section 608.02, Rev. 1, Sept. 1995, for blue, green, yellow and red to illustrate how the color patterns just described are defined. FIGS. 5–9 are cross-sectional or vertical slices through the earth's subsurface, whereas the plots just discussed are map views. Map views can be created from FIGS. 5–9 by cutting through the events along a certain time slice or depth, for example line 50 represents a given time slice or depth. As described above and for purposes of this discussion the direction of dip for the seismic events can be identified by the change in phase from high angles of instantaneous phase (i.e., red) to low angles of instantaneous phase (i.e., blue). The color scale decreases from red to yellow to green to blue. Red represents angles from 360 to 271 degrees. Yellow represent angles from 270 to 181 degrees. Green represents angles from 180 to 91 degrees. Blue represents angles from 90 to 1 degrees.

Accordingly, FIG. 5 illustrates a dip direction down (i.e., down dip) from right to left on the page identified by a change from red to yellow, yellow to green, green to blue. FIG. 6 illustrates an anticline as described along line 50 by the pattern of change from blue to green to yellow to red to yellow to green to blue. FIG. 7 illustrates a syncline as described along line 50 by the pattern of change from blue to red to yellow to green to blue to green to yellow to red to blue. FIG. 8 illustrates a fault as described along line 50 by the rapid change from red to yellow to blue, thus skipping over green. Likewise, FIG. 9 illustrates an unconformity as described along line 50 by the change from red to a small band of yellow to blue.

Calculation of the Spatial Frequency Attribute

The plot of instantaneous phase in FIG. 4 although semi-quantitatively illustrates dip magnitude (i.e., it illustrates apparent dip magnitude) by the compactness or spaciousness of each of the color bands, which is quite valuable, it is also valuable to show true dip magnitude (i.e., quantitative dip magnitude). The spatial rate of change of instantaneous phase is a useful edge detection attribute as rapid changes in the instantaneous phase often correspond to significant changes caused by faults, stratigraphic boundaries, lithology changes and pore fluid changes. Therefore, another embodiment of the present invention is the calculation and utilization of the spatial (x-y plane) rate of change of instantaneous phase. The rate of change of instantaneous phase with respect to horizontal (time slice) distance is defined as the spatial frequency, such that the spatial frequency ($\omega_s$) of the data is defined as:

$$\omega_s = \Delta\phi_h/\Delta h \tag{1}$$

where $\Delta\phi_h$ is the horizontal change in instantaneous phase in space and $\Delta h$ is the horizontal distance in the direction of maximum rate of change of instantaneous phase over which the phase change was measured. From equation (1) we can see that the true spatial frequency is calculated in the direction of the maximum rate of change of the instantaneous phase in the data. This phase change has an orientation that need not be, and rarely is, parallel to either the line (x) or common depth point (y) direction. Likewise, the orientation can change in direction from location to location.

One way to calculate the spatial frequency is to calculate the frequency with respect to the x ($\omega_x$) and y ($\omega_y$) directions independently and to calculate the true spatial frequency from these results using simple trigonometric principles. In other words, equation (1) above can be applied to the x direction [$\omega_x=\Delta\phi_x/\Delta x$] and to the y direction [$\omega_y=\Delta\phi_y/\Delta y$] which results in two apparent spatial frequencies. Then simple trigonometric principles are applied to the two apparent spatial frequencies to arrive at the true spatial frequency. Although, each of the directionally orientated frequencies ($\omega_x$ and $\omega_y$) provide useful information for edge detection, especially when the features under consideration are perpendicular to either direction, the true spatial frequency provides more accurate information. The true spatial frequency, which can be calculated using the components of change in the x and y direction, provides an improved edge detection attribute that is calculated in the following way:

$$\omega_s = sqrt[(\Delta\phi_x/\Delta x)^2 + (\Delta\phi_y/\Delta y)^2] \tag{2}$$

FIG. 10 is a plot at a single time (or depth) using spatial frequency as the plot attribute, illustrating increasing frequency (i.e., higher rates of change of phase) as increasing shades of gray. Any suitable color or shading scheme may be utilized. Preferably, at least four distinguishable colors or shades are used. Larger number of colors or shades give better apparent resolution. In FIG. 10, the color scale decreases from white to light grey to dark grey to black. Each shade is representative of a different range of spatial frequency. White represents frequency values from −30 to 30. Light grey represents frequency values from 31 to 65 and −31 to −65. Dark grey represents frequency values from 66 to 100 and −66 to −100. Black represents frequency values from 101 to 127 and −101 to −127 when the floating point data has been scaled to an 8 bit image. Edges such as faults 56 and anomalous stratigraphic boundaries are easily recognizable as continuous, linear features on the image. As a result, the spatial frequency attribute enables rapid evaluation Of time slices and three-dimensional volumes without interpretational bias.

The convention just discussed is applied for purposes of illustration in this description, an opposite convention (or any convention, including a color convention) is equally applicable to the present invention. Once the spatial frequency has been calculated for each point which is to appear in the plot, shades of color are assigned to each point based on the spatial frequency value. Any suitable color scheme may be utilized. Preferably, at least four distinguishable colors are used. Larger numbers of Colors give better apparent resolution which allows for greater ease in interpretation. For purposes of this discussion the color scale decreases from red to yellow to green to blue. Each color is representative of a different range of spatial frequency values. Red represents spatial frequency values from −127 to −101 and 127 to 101. Yellow represents spatial frequency values from −100 to −66 and 100 to 66. Green represents spatial frequency values from −65 to −31 and 65 to 31. Blue represents spatial frequency values from −30 to 30 when the floating point data has been scaled to an 8 bit image.

Time Dip and Azimuth as the Display and/or Plot Attributes

As noted above, spatial frequency is only semi-quantitatively related to dip magnitude because the calculation does not allow for spatial and temporal variations in the frequency of the input data. However, dip magnitude can be calculated by utilizing the derivative of the phase with respect to space and time. Instantaneous frequency is the rate of change of phase with respect to time (i.e., in the vertical dimension) and, as noted above, spatial frequency is the rate of change of phase with respect to horizontal distance (i.e., time slice dimension). The following discussion shows how frequency can be utilized to generate the new attributes of dip magnitude and dip azimuth.

The intersection of dipping seismic events with a horizontal plane, which provides a map or time slice view of the seismic events, can be analogized to an outcrop of strata onto a horizontal surface. This simple geometric principal is the key to understanding how dip magnitude and dip azimuth can be calculated from time slices of instantaneous phase and ultimately from frequency. If we consider the two-dimensional example of outcrop on a horizontal plane where the apparent stratigraphic thickness S' is known from a vertical well (FIG. 11) and the cross-section is in the direction of maximum (true) dip, the true dip can be calculated from the apparent vertical thickness (S') observed in the well by the following:

$$\mu = \tan^{-1}(S'/x) \tag{3}$$

where μ is the true dip, S' is the stratigraphic thickness and x is the distance along the outcrop. If the cross-section is not in the direction of true dip then equation (3) will result in the calculation of apparent dip magnitude. The apparent dip magnitude is the angle between the horizontal and the dipping plane in some pre-defined direction and is less than or equal in magnitude to the true dip magnitude.

The above analysis is analogous to a distance (x) along a constant time (or depth) sample and a vertical seismic trace piercing the constant time sample, therefore, if we consider two adjacent traces cut by a dipping event that has an apparent time dip of $\mu_{at}$ (FIG. 12). The time dip can be described in the following way:

$$\mu_{at} = \tan^{-1}(\Delta t/\Delta x) \tag{4}$$

where Δt is the time difference between when a seismic event 30 occurs on the first trace 28 and when that same event appears on the next trace 32 and Δx is the distance between the two adjacent traces 28 and 32. As can be seen in FIG. 12, there also are changes in the instantaneous phase in both the x direction and the time direction between trace 28 and trace 32 with respect to the event 30. For the two-dimensional case in FIG. 12, the instantaneous frequency $\omega_t$ and spatial frequency $\omega_x$ of the data are defined as:

$$\omega_t = \Delta\phi_t/\Delta t \tag{5}$$

$$\omega_x = \Delta\phi_x/\Delta x \tag{6}$$

where $\phi_t$ and $\phi_x$ are the instantaneous phase in time and space respectively, t is time and x is distance. If we assume that the change in phase with respect to time and space are the same then Δt and Δx in equation (4) can be substituted in the following manner:

$$\Delta t = \Delta\phi/\omega_t$$

$$\Delta x = \Delta\phi/\omega_x$$

such that:

$$\mu_{at} = \tan^{-1}(\omega_x/\omega_t) \tag{7}$$

The only assumption made in this substitution is that the change in phase in the spatial domain is the same as the time domain. This is a valid assumption as the only exception to this situation is if there is noise present in one trace that is not present at the other. As is conventionally known, effects from noise are present within all seismic data and are present on surfaces that have been autopicked using current interpretation systems. The effects of noise are removed from dip and azimuth calculations for autopicked surfaces by calculating the weighted average for a group of bins. A similar process, using a number of traces, can be employed to remove the effects of noise on the dip calculations of the present invention thus maintaining the integrity of equation (7). This technique is described in more detail below in the section on multi-trace and multi-directional analysis.

Equation (7) above represents a two-dimensional example and describes how the apparent time dip can be calculated for a two-dimensional seismic profile. Three-dimensional seismic data can be used to calculate the true time dip and azimuth of the dipping events from the apparent dip calculated in two orthogonal directions. The results of the apparent dip from the two orthogonal directions can be used to calculate the true dip magnitude and direction using simple trigonometric principles. In other words, equation (7) above can be applied to the x direction (as shown) and to the y direction [$\mu_{at} = \tan^{-1}(\omega_y/\omega_t)$] which results in two apparent dips. Then simple trigonometric principles are applied to the two apparent dips to arrive at the true dip magnitude and direction.

Because of the relationship between instantaneous phase and time dip (shown in FIG. 2), the direction of maximum rate of change of instantaneous phase is the direction of true dip of the seismic events. The dip azimuth can, therefore, be calculated from the instantaneous phase in the following way:

$$\theta = \alpha + \tan^{-1}(\omega_x/\omega_y) \tag{8}$$

where θ is the dip azimuth, α is the angle between true north and the x direction, $\omega_x$ is the spatial frequency in the x direction and $\omega_y$ is the spatial frequency in the y direction orthogonal to x ($\omega_y$ is positive to the right of x and negative to the left). Likewise, the true time dip ($\mu_t$) can be calculated by modifying equation (7) to include the spatial frequency in the orthogonal x and y directions.

$$\mu_t = \tan^{-1}\{sqrt(\omega_x^2 + \omega_y^2)/\omega_t\} \qquad (9)$$

While the invention uses the spatial derivatives of instantaneous phase (i.e., the time slice domain), three-dimensional volumes of the various attributes can be generated by processing all of the time samples in a three-dimensional volume for producing three-dimensional displays and/or plots. Furthermore, map displays and/or plots are produced from the three-dimensional volumes to show dip magnitude, dip azimuth and instantaneous phase of seismic events as they intersect specific time slices using the relationships discussed above. These plots identify the dip direction and magnitude of seismic events that intersect with the time slice under consideration and also locate faults and anomalous stratigraphic boundaries that appear as steeply dipping and misorientated features on the plots, as discussed with respect to FIGS. 13 and 15–17.

FIG. 13 is an illuminated dip azimuth plot plotted with the conventional computer system and plotter described herein. The dip azimuth was derived from the instantaneous phase using the azimuth calculation of equation (8). FIG. 13 uses a white to black shading convention similar to that described above except white represents azimuth angles from 1 to 60 degrees, light gray represents azimuth angles from 61 to 120 degrees and from 301 to 360 degrees, dark gray represents azimuth angles from 121 to 180 degrees and from 241 to 300 degrees, and black represents angles from 181 to 240 degrees. However, a color convention or any other convention can be used as well. The illuminated azimuth plot results in a much clearer picture of the structure than a conventional amplitude plot. In fact, the illuminated azimuth plot of FIG. 13, which has the sun in the top right, yields a pseudo-three-dimensional representation of the time slice. This is a very powerful image, as no interpreter/geoscientist interpretation is required to generate the image, thus eliminating the bias of the interpreter as to the structural form of the seismic events. The convention in FIG. 13 has an imaginary sun in the top right of the image, therefore, the darkest surfaces are surfaces dipping to the bottom left (thus in the shade) and the lightest surfaces are dipping to the top right (therefore in direct sunlight). The shades of gray represent variations in the dip azimuth between the two directions. For example, the top to bottom (or north to south) trending axis of the structures is easily identified as a boundary between the light and dark areas. In its current form (FIG. 13), the effect of phase cycle skipping is evident in the dip azimuth plot. This effect is evident in FIG. 13 by the light ridges 60 in the dark areas and the dark ridges 62 in the light areas that give the appearance of onion layer weathering to the image. The cycle skipping ridges 60,62 represent the zero crossings of the data, therefore, if the interpreter desires to pick horizons at zero crossings these features can be used for lateral correlations. However, if desired by the interpreter, the phase cycle skipping effect can be removed by calculating the frequencies in equations (5) and (6) in the wave number domain as will be described below, which yields a continuous function of phase.

FIG. 14 illustrates the cause of phase cycle skipping with a graph of instantaneous phase versus distance. The phase of the data decreases from left to right suggesting that the events are dipping towards the right. However, considering a line 34 with infinite samples, when the phase passes through zero at point 36 a vertical step is created as the phase jumps back to 360° resulting in segment 37 of line 34. This vertical step is the phase cycle boundary that is evident in FIG. 13. The effect of the step becomes more apparent when considering reduced sample spacing. As the sample spacing is reduced, the cycle skipping ridge becomes lower in angle and wider spaced, as illustrated in FIG. 14. Segment 38 of line 34 is an example of reduced sample spacing resulting in a wider step. For an even greater reduced sample spacing, as shown by segment 40, the mid-point of the step may not even line up with the true position of the phase boundary as shown by the offset sample spacing line segment 40.

Although the phase cycle skipping effect can be suppressed by conventionally filtering the data, it can be avoided by calculating the dip and strike information by using the real and imaginary components of the seismic trace to calculate the spatial and instantaneous frequencies. Equation (7) illustrated that the time dip can be calculated from the instantaneous frequency and the spatial frequency. These two derivatives of phase (i.e., instantaneous frequency and spacial frequency) can also be calculated in the wave number domain in the following way:

$$\omega_t = \Delta\phi/\Delta t = [F_{It}'*F_R - F_{Rt}'*F_I]/[F_R^2 + F_I^2] \qquad (10)$$

and $$\omega_x = \Delta\phi/\Delta x = [F_{Ix}'*F_R - F_{Rx}'*F_I]/[F_R^2 + F_I^2] \qquad (11)$$

where $F_R$ and $F_I$ are the complex functions of the real and imaginary traces, respectively, $F_{It}'$ and $F_{Rt}'$ are the derivatives of these functions with respect to time, respectively, and $F_{Ix}'$ and $F_{Rx}'$ are the derivatives of these functions with respect to space, respectively. Equations (10) and (11) have the advantage that they result in continuous functions of phase, therefore; the effect of phase cycle skipping is removed. The imaginary part of the complex seismic trace is generated by performing a Hilbert transform on the data as is generally known by one of ordinary skill in the art. Such an application of the Hilbert transform is described in an article entitled "Application of Amplitude, Frequency and Other Attributes to Stratigraphic and Hydrocarbon Determination", by M. T. Tanner and R. E. Sheriff which appeared in Memoir 26, Seismic Stratigraphy-Application to Hydrocarbon Exploration, edited by Charles E. Payton, Amer. Association of Petroleum Geologists (1977).

FIG. 15 illustrates the results of removing the phase cycle skipping using this method. FIG. 15 uses the whim to black shading convention as described above with respect to FIG. 13, however a color convention can be used as well. FIG. 15 is an illuminated dip azimuth plot produced with a conventional computer system and plotter. A comparison of FIG. 15 to FIG. 13 shows that the structure appears much more subtle in the de-cycled image (FIG. 15), whereas in the image where the cycle skipping is still present (FIG. 13) the phase boundaries act as contour lines. There are a number of ridges within the de-cycled image (FIG. 15) that are not visible in FIG. 13. These ridges represent geologically meaningful boundaries, such as faults and stratigraphic boundaries within the subsurface, and are not an artifact of the form of the seismic traces as are the ridges in FIG. 13. In addition, the dip azimuth values in FIG. 15 represent the true dip azimuths of the events intersecting with the plotted time slice.

In addition to being able to calculate the true dip azimuth with the decycling algorithm it is possible to calculate true time dip magnitude. FIG. 16 is a true time dip magnitude plot prepared with a conventional computer system and plotter. FIG. 16 shows the time dip magnitude calculated from instantaneous phase before the removal of phase cycle skipping boundaries 60,62. FIG. 17 is the same plot with the phase cycle skipping removed. FIGS. 16 and 17 use a white to black shading convention similar to that described above except whim represents magnitude values from 0 to 30, light grey represents values from 31 to 65, dark grey represents values from 66 to 100 and black represents values from 101 to 127 when the floating point data is scaled to positive values from 0–127 as previously described. However, a color convention or any other conventions can be used as well. The dip magnitudes of FIG. 16 are dominated by the steep ridges associated with the phase boundaries illustrated in FIG. 13. There are a number of other edges in the image but these cannot be readily distinguished because of the noise created by the phase cycle boundaries. These steeply dipping phase cycle boundaries are an artifact of phase boundaries and do not represent the true dip magnitude at that location. In comparison to FIG. 16, FIG. 17 shows the dip magnitude calculated using equations (10) and (11) to remove the phase cycle skipping. The image in FIG. 17 has a more geological appearance in which steeper 'edges' can be more clearly defined. Areas of steeper dip can be distinguished by the darker color areas and there is a fabric that follows the form of the structural features (i.e., top to bottom in FIG. 17). There are also a number of steep lineaments (i.e., dark narrow areas) within the decycled dip map that represent fault breaks.

One of the advantages of the present invention is the ability to detect edges which highlights the location of faults. Faults are discontinuities within the data. They can result from changes in dip between the hangingwall and the footwall blocks, for example, and their displacement will cause rapid lateral changes in amplitude and phase of the seismic data. Because the spatial resolution of amplitude displays and plots is not very good, there is a problem locating fault breaks with amplitude. However, in the displaying and plotting of instantaneous phase (FIG. 3), dip magnitude (FIG. 17) and/or dip azimuth (FIG. 15) using the present invention, the fault breaks are plotted much sharper as rapid changes in color (i.e., in the phase) across the features (FIG. 3), or as occurrences of linear features or steep lineaments on the dip magnitude (FIG. 17) and/or dip azimuth (FIG. 15) plots. In addition, the phase and dip information can be used to interpret the geometric consequences of the faults and which side of the fault is down thrown.

In addition to the above, the present invention provides the interpreter with the ability to detect edges, such as faults or stratigraphic boundaries, very early in the interpretation process. These edges are unbiased by any user interpretation. Unlike the conventional horizon slice method described earlier, the present invention will automatically highlight the fault network for the interpreter/geoscientist at a full range of scales throughout the two-dimensional section or three-dimensional volume.

True Dip Magnitude as the Display and/or Plot Attribute

Equation (9) above describes how true time dip magnitude can be calculated from the spatial and instantaneous frequencies. The instantaneous frequency is a time dependent function, which in the current embodiment is converted to depth in order to calculate the true dip magnitude. The true dip magnitude can be calculated by operating on seismic data that has been stretched to depth or by introducing velocity into equation (9) as illustrated below:

$$\mu_t = \tan^{-1}[\{sqrt(\omega_x^2 + \omega_y^2) * v_t\}/\omega_n] \quad (12)$$

where $\mu_t$ is the true dip magnitude and $v_t$ is the velocity at the time under consideration. The instantaneous frequency in equation (10) can, therefore, be calculated with respect to depth so that:

$$\omega_z = \Delta\phi/\Delta z = [F_{Iz}' * F_R - F_{Rz}' * F_I]/[F_R^2 + F_I^2] \quad (13)$$

where $F_{Iz}'$ and $F_{Rz}'$ are the derivatives with respect to depth of the complex functions of the real and imaginary traces, respectively.

One advantage of the true dip magnitude calculation technique is that it can be used to generate a volume of dip and strike information that is unbiased by an interpreter/geoscientist. These data volumes are then used to build the interpretation thus utilizing the maximum amount of spatial information within the data. The results of these data volumes can also be correlated with and compared directly to other dip magnitude and azimuth calculations obtained from outcrop measurements or from wireline dipmeter information. These techniques, therefore, enable edge detection for faults and other features to be performed early in the interpretation process and in depth.

Multi-trace and multi-direction analysis

The above description, specifically equations (8) and (9), indicates how the dip azimuth and magnitude can be calculated from the spatial frequency in two orthogonal directions (x and y). An alternative method of calculating the spatial frequency is to use a number of different, non-orthogonal directions. This can be achieved in three-dimensional seismic data by the inclusion of additional seismic traces. For example, a grid of 3 by 3 traces yields eight possible directions to calculate the spatial derivative (FIG. 18 is a map view of nine seismic traces). This is reduced to four directions when two samples (e.g., 2 and 4, 3 and 5, 6 and 8, 7 and 9) directly opposite the central trace 1 are both used to calculate a weighted average for that direction, as is generally known by one of ordinary skill in the art. The four directions (or the eight directions if a weighted average is not used) are combined together to calculate the spatial frequency and dip azimuth by using a least squares fit of a sine function to the four (or eight) values (FIG. 19). One advantage of this approach is that the resulting spatial frequency and azimuth are statistically derived and include more information, thus making the result less susceptible to noise in data and more stable in areas of high dip.

The approach of including more data for the derivative calculation can be expanded from a grid of 3 by 3 traces to grids of 5, 7, 9, etc. traces in both the inline and crossline directions. Including more traces provides a more robust weighted average of the rate of change of phase in any one direction and more directions to be included into the least squares fit of the sign function. A preferable trace spacing is 2 to 50 samples, more preferably 3 to 9 samples, but the invention is equally applicable for 1 to any number of samples.

The methods of the invention according to the above-described preferred embodiments were applied using a computer program written in C computer language on a conventional computer system such as shown in FIG. 20 comprising a central processing unit 42, display 44, input device 46, and plotter 48. A preferred system comprises an "Indigo II extreme" computer and corresponding 17" monitor, based on the 32 bit MIPS RISC R4400 microprocessor from Silicon Graphics Inc. in Mountain View, Calif. The system has 1 R4400, 250 mhz chip with 256 megabytes of RAM and 12 gigabytes of disk storage capacity. Input data 47 for the system includes, but is not limited to, a digital computer file with gridded instantaneous phase seismic data. Various plotters can be used to produce the volumes and map views, for example, a "DesignJet 755CM", model no. C3198A from the Hewlett-Packard Co. in Palo Alto, Calif. It should be appreciated that the results of the methods of the invention can be displayed, plotted, or both.

There is a significant time savings in the two-dimensional and three-dimensional seismic interpretation processes when using the methods described above for many reasons including, but not limited to: the fault correlation and structural framework are generated early in the interpretation process; a fewer number of time slices are required to describe a structure than associated inlines and crosslines; downplunge projections improve structural understanding; and event terminations (e.g., onlap, downlap, etc.) are more readily apparent for sequence stratigraphy.

While the invention has been described with reference to the foregoing embodiments, changes and variations may be made thereto which fall within the scope of the appended claims. Further changes and variations may be made thereto which are within the scope of the appended claims. All such modifications and/or changes are intended to be included within the scope of the claims.

What is claimed is:

1. A method of processing data of seismic traces for geophysical interpretation of the earth's subsurface, comprising the steps of:
   determining a spatial frequency value by taking the directional spatial derivative of the instantaneous phase for each of a plurality of x,y, t(z) data points in the seismic data; and
   posting the spatial frequency values to identify changes within the earth's subsurface.

2. The method of claim 1, wherein the spatial frequency values are determined by:

$$\omega_x = \Delta\phi_x/\Delta x$$

where $\Delta\phi_x$ is a change in the instantaneous phase value in the x direction and $\Delta x$ is a distance between selected traces in the x direction.

3. The method of claim 1, wherein the spatial frequency values are determined by:

$$\omega_y = \Delta\phi_y/\Delta y$$

where $\Delta\phi_y$ is a change in the instantaneous phase value in the y direction and $\Delta y$ is a distance between selected traces in the y direction.

4. The method of claim 1, wherein the spatial frequency values are determined by:

$$\omega_s = \Delta\phi_h/\Delta h$$

where $\Delta\phi_h$ is a change in the instantaneous phase values in a horizontal plane and $\Delta h$ is a distance between selected traces in the direction of maximum rate of change of instantaneous phase.

5. The method of claim 1, wherein the spatial frequency values are determined by:

$$\omega_s = sqrt[(\Delta\phi_x/\Delta x)^2 + (\Delta\phi_y/\Delta y)^2]$$

where $\Delta\phi_x$ is a change in the instantaneous phase value in the x direction and $\Delta x$ is a distance between selected traces in the x direction and $\Delta\phi_y$ is a change in the instantaneous phase value in the y direction and y is a distance between selected traces in the y direction.

6. The method of claim 1, further comprising:
   performing a Hilbert transform for each of the plurality of data points in the seismic data; and
   determining the spatial frequency by:

$$\omega_s = [F_{Ix}'*F_R - F_{Rx}'*F_I]/[F_R^2 + F_I^2]$$

where $F_R$ and $F_I$ are the complex functions of the real and imaginary traces, respectively, and $F_{Ix}'$ and $F_{Rx}'$ are the derivatives of these functions with respect to space, respectively.

7. The method of claim 1, wherein determining the spatial frequency comprises using a least squares fit of a sine function to combine the plurality of data points.

8. The method of claim 1, wherein determining the spatial frequency comprises combining each of a plurality of non-orthogonal data points in the seismic data.

9. A method of processing data of seismic traces for geophysical interpretation of the earth's subsurface, comprising the steps of:
   determining a spatial frequency value for each of a plurality of data points in the seismic data;
   determining an instantaneous frequency value for each of the plurality of the data points of the seismic data;
   determining an apparent dip magnitude value for each of the plurality of data points in a predetermined direction using the spatial frequency value and the instantaneous frequency value; and
   posting the apparent dip magnitude value for each of the plurality of data points to identify changes within the earth's subsurface.

10. The method of claim 9, further comprising:
    performing a Hilbert transform for each of the plurality of data points in the seismic data;
    determining the spatial frequency by:

$$\omega_s = [F_{Is}'*F_R - F_{Rs}'*F_I]/[F_R^2 + F_I^2]$$

where $F_R$ and $F_I$ are the complex functions of the real and imaginary traces, respectively, and $F_{Is}'$ and $F_{Rs}'$ are the derivatives of these functions with respect to space, respectively; and
    determining the instantaneous frequency by:

$$\omega_t = [F_{It}'*F_R - F_{Rt}'*F_I]/[F_R^2 + F_I^2]$$

where $F_R$ and $F_I$ are the complex functions of the real and imaginary traces, respectively, $F_{It}'$ and $F_{Rt}'$ are the derivatives of these functions with respect to time, respectively.

11. The method of claim 10, wherein the apparent dip value determining step comprises:
    determining the apparent dip magnitude value for each of the plurality of data points by:

$$\mu_{ar} = tan^{-1}(\omega_s/\omega_t).$$

12. A method of processing data of seismic traces for geophysical interpretation of the earth's subsurface, comprising the steps of:
    determining a spatial frequency value for each of a plurality of data points in the seismic data;
    determining an instantaneous frequency value for each of the plurality of the data points of the seismic data;
    determining a dip magnitude value for each of the plurality of data points using a spatial frequency value and the instantaneous frequency value; and posting the dip magnitude value for each of the plurality of data points to identify changes within the earth's subsurface.

13. The method of claim 12, further comprising:
performing a Hilbert transform for each of the plurality of data points in the seismic data;
determining the spatial frequency by:

$$\omega_s = [F_{Ls}'*F_R - F_{Rs}'*F_I]/[F_R^2 + F_I^2]$$

where $F_R$ and $F_I$ are the complex functions of the real and imaginary traces, respectively, and $F_{Is}'$ and $F_{Rs}'$ are the derivatives of these functions with respect to space, respectively; and
determining the instantaneous frequency by:

$$\omega_t = [F_{It}'*F_R - F_{Rt}'*F_I]/[F_R^2 + F_I^2]$$

where $F_R$ and $F_I$ are the complex functions of the real and imaginary traces, respectively, $F_{It}'$ and $F_{Rt}'$ are the derivatives of these functions with respect to time, respectively.

14. The method of claim 12, wherein the dip magnitude value determining step comprises:
determining a time dip magnitude value for each of the plurality of data points by:

$$\mu_t = \tan^{-1}(\omega_s/\omega_t).$$

15. The method of claim 14, further comprising:
performing a Hilbert transform for each of the plurality of data points in the seismic data; and
determining the spatial frequency by:

$$\omega_s = [F_{Ls}'*F_R - F_{Rs}'*F_I]/[F_R^2 + F_I^2]$$

where $F_R$ and $F_I$ are the complex functions of the real and imaginary traces, respectively, and $F_{Is}'$ and $F_{Rs}'$ are the derivatives of these functions with respect to space, respectively.

16. The method of claim 15, wherein determining the spatial frequency comprises combining each of a plurality of non-orthogonal data points in the seismic data.

17. The method of claim 12, wherein the dip magnitude value determining step comprises:
determining a true dip magnitude value for each of the plurality of data points by:

$$\mu_t = \tan^{-1}[\{sqrt(\omega_x^2 + \omega_y^2)*v_t\}/\omega_t]$$

where $\mu_t$ is the true dip magnitude and $v_t$ is the velocity at the time under consideration.

18. The method of claim 17, further comprising:
performing a Hilbert transform for each of the plurality of data points in the seismic data; and
determining the spatial frequency by:

$$\omega_x = [F_{Lx}'*F_R - F_{Rx}'*F_I]/[F_R^2 + F_I^2]$$

and $$\omega_y = [F_{Ly}'*F_R - F_{Ry}'*F_I]/[F_R^2 + F_I^2]$$

and $$\omega_s = sqrt(\omega_x^2 + \omega_y^2)$$

where $F_R$ and $F_I$ are the complex functions of the real and imaginary traces, respectively, and $F_{Lx}'$ and $F_{Rx}'$ and $F_{Ly}'$ and $F_{Ry}'$ are the derivatives of these functions with respect to x and y, respectively.

19. The method of claim 18, wherein determining the spatial frequency comprises combining each of a plurality of non-orthogonal data points in the seismic data.

20. A method of processing data of seismic traces for geophysical interpretation of the earth's subsurface, comprising the steps of:
determining a spatial frequency value in the x direction for each of a plurality of data points in the seismic data;
determining a spatial frequency value in the y direction for each of a plurality of data points in the seismic data;
determining a dip azimuth value for each of the plurality of data points using the respective spatial frequency in the x direction and spatial frequency in the y direction for each of the plurality of data points; and
posting the dip azimuth values for each of the plurality of data points to identify changes within the earth's subsurface.

21. The method of claim 20, wherein determining the spatial frequency comprises combining each of a plurality of non-orthogonal data points in the seismic data.

22. The method of claim 20, wherein the spatial frequency in the x direction is determined by:

$$\omega_x \Delta\phi_x/\Delta x$$

where $\Delta\phi_x$ is a change in instantaneous phase in the x direction and $\Delta x$ is a distance between selected traces in the x direction; and wherein the spatial frequency in the y direction is determined by:

$$\omega_y = \Delta\phi_y/\Delta y$$

where $\Delta\phi_y$ is a change in instantaneous phase in the y direction and $\Delta y$ is a distance between selected traces in the y direction; and wherein the dip azimuth ($\theta$) is determined by:

$$\theta = \alpha + \tan^{-1}(\omega_x/\omega_y)$$

where $\alpha$ is the angle between true north and the x direction.

23. The method of claim 22, wherein determining the spatial frequency comprises combining each of a plurality of non-orthogonal data points in the seismic data.

24. The method of claim 20, further comprising:
performing a Hilbert transform for each of the plurality of data points in the seismic data; and
determining the dip azimuth with:

$$\omega_x = [F_{Lx}'*F_R - F_{Rx}'*F_I]/[F_R^2 + F_I^2]$$

and $$\omega_y = [F_{Ly}'*F_R - F_{Ry}'*F_I]/[F_R^2 F_I^2]$$

and $$\theta = \alpha + \tan^{-1}(\omega_x/\omega_y)$$

where $\alpha$ is the angle between true north and the x direction. $F_R$ and $F_I$ are the complex functions of the real and imaginary traces, respectively, and $F_{Lx}'$ and $F_{Rx}'$ and $F_{Ly}'$ and $F_{Ry}'$ are the derivatives of these functions with respect to x and y, respectively.

25. The method of claim 24, wherein determining the spatial frequency comprises combining each of a plurality of non-orthogonal data points in the seismic data.

26. A method for producing an instantaneous phase seismic display from data of seismic traces for geophysical interpretation of the earth's subsurface, comprising the steps of:

determining an instantaneous phase value for each of a plurality of data points in the data of seismic traces; and posting the instantaneous phase values at a constant horizontal level to transform the instantaneous phase values into an indication of a dip magnitude and a dip azimuth of seismic events associated with the earth's subsurface.

27. The method of claim 26, further comprising:

extracting the instantaneous phase values for a constant stratigraphic level.

* * * * *